US 6,809,138 B2

(12) United States Patent
Imori et al.

(10) Patent No.: US 6,809,138 B2
(45) Date of Patent: Oct. 26, 2004

(54) ADHESION ACCELERATOR FOR BONDING RUBBER TO METAL AND RUBBER COMPOSITION

(75) Inventors: Toru Imori, Kitaibaraki (JP); Kazunori Iida, Hitachi (JP)

(73) Assignee: Nikko Materials Co., Ltd., Tokyo (JP)

( * ) Notice: Subject to any disclaimer, the term of this patent is extended or adjusted under 35 U.S.C. 154(b) by 101 days.

(21) Appl. No.: 10/166,117

(22) Filed: Jun. 10, 2002

(65) Prior Publication Data

US 2003/0036596 A1 Feb. 20, 2003

Related U.S. Application Data

(63) Continuation-in-part of application No. 09/402,571, filed as application No. PCT/JP99/00737 on Feb. 19, 1999.

(30) Foreign Application Priority Data

Feb. 19, 1998 (JP) .............................. 10-037417

(51) Int. Cl.⁷ ................................. C08K 5/09
(52) U.S. Cl. ...................... 524/398; 524/399
(58) Field of Search .................. 524/398, 399

(56) References Cited

U.S. PATENT DOCUMENTS

| | | | |
|---|---|---|---|
| 1,919,718 A | 7/1933 | Gray | 524/398 |
| 2,912,355 A | 11/1959 | Formanek et al. | 154/130 |
| 4,076,668 A | 2/1978 | Kaneda et al. | 260/23.7 |
| 4,292,220 A | 9/1981 | Novak et al. | 260/23 AR |
| 5,244,955 A | 9/1993 | Toyoda | 524/397 |
| 5,292,364 A | 3/1994 | Hiraiwa et al. | 106/287.1 |
| 5,409,764 A | 4/1995 | Otsuki et al. | 428/221 |

FOREIGN PATENT DOCUMENTS

| | | |
|---|---|---|
| EP | 0 570 159 | 11/1993 |
| GB | 1 169 366 | 11/1969 |
| JP | 57-197155 | 12/1982 |
| JP | 59-207949 | 11/1984 |
| JP | 60-15444 | 1/1985 |
| JP | 60-158230 | 8/1985 |
| JP | 60-199643 | 10/1985 |
| JP | 61-60743 | 3/1986 |
| JP | 6-65142 | 3/1994 |
| JP | 6-329838 | 11/1994 |
| JP | 6-329839 | 11/1994 |
| JP | 6-329840 | 11/1994 |
| JP | 9-216968 | 8/1997 |
| JP | 9-316289 | 12/1997 |
| JP | 11-060820 | 3/1999 |

*Primary Examiner*—Peter D. Mulcahy
(74) *Attorney, Agent, or Firm*—Flynn, Thiel, Boutell & Tanis, P.C.

(57) ABSTRACT

An adhesion accelerator for bonding rubber to metal contains a metal organic compound containing nickel and another metal organic compound containing zinc. Further, there is provided a rubber composition containing the above adhesion accelerator in an amount of 0.1 to 10 parts by weight and sulfur in an amount of 3 to 8 parts by weight, with respect to 100 parts by weight of the rubber component

21 Claims, No Drawings

ADHESION ACCELERATOR FOR BONDING RUBBER TO METAL AND RUBBER COMPOSITION

CROSS-REFEREBCE TO RELATED APPLICAITON

This application is a continuation-in-part application of U.S. application Ser. No. 09/402 571, filed Oct. 1, 1999, which is a nationalization of PCT application PCT/JP99/00737, filed Feb. 19, 1999, which was not published in English under PCT Article 21 (2) and claims priority from Japanese Patent Application No. 10-37417, filed Feb. 19, 1998.

BACKGROUND OF THE INVENTION

1. Field of the Invention

The present invention relates to an adhesion accelerator for enhancing the adhesive strength between rubber and metal. In particular, this invention relates to an adhesion accelerator for enhancing the adhesive strength of rubber to steel cords. In addition, the present invention also relates to a rubber composition containing the above adhesion accelerator.

2. Description of the Prior Art

Heretofore, in order to improve the adhesive strength of natural or synthetic rubber to steel cords used as a reinforcement for a radial tire or a belt of a belt conveyer, there have been used, as an adhesion accelerator, cobalt-containing metal organic compounds such as cobalt stearate, cobalt naphthenate, cobalt-boron complex, etc. Although these cobalt-containing metal organic compounds have a high vulcanization accelerating ability, the presence of cobalt in rubber lowers the storage stability. Besides cobalt-containing organic compounds, some other metal organic compounds have also been investigated. In fact, many patents disclose the use of some specific metal organic compounds as adhesive strength improving agents. For instance, some organic acid cobalt salts are disclosed in the following patents. U.S. Pat. No. 1,919,718 discloses cobalt acetate and cobalt salts of low molecular fatty acids, particularly a cobalt stearate. U.S. Pat. No. 2,912,355 discloses cobalt oleate and cobalt citrate. U.K. patent 1,169,366 discloses cobalt linoleate and cobalt resinate. U.S. Pat. No. 4,076,668 discloses cobalt salts of naphthenic acid, octylic acid, tall oil acid, etc. Japanese Patent Application Laid-Open No. 61-60743 discloses cobalt propionate, calcium propionate, magnesium propionate, nickel propionate, zinc propionate, etc. Japanese Patent Application Laid-Open No. 6-65142 discloses a metallic soap having a structure of naphthalene or biphenyl. Japanese Patent Application Laid-Open No. 60-15444 and Japanese Patent Application Laid-open No. 60-158230 disclose cobalt borate and the like. Japanese Patent Application Laid-Open No. 60-199643 discloses a metal salt of thiosulfuric acid ester. Japanese Patent Application Laid-Open No. 59-207949 and Japanese Patent Application Laid-Open No. 6-329838 disclose a metallic soap having a specific ratio of cobalt to nickel, as an adhesion improving material. Japanese Patent Application Laid-Open No. 6-329840 discloses a metallic soap having a specific ratio of cobalt to zinc, as an adhesion improving material. Although the above substances have a good adhesive property in a specific aspect, they still fail to show a well-balanced adhesive strength as a whole.

SUMMARY OF THE INVENTION

It is an object of the present invention to provide an improved adhesion accelerator having an excellent adhesive property well comparable with or far superior to that of a cobalt organic compound and having an improved stability for storing. It is another object of the present invention to provide a rubber composition containing such an adhesion accelerator.

The present inventors have found that the purposes of the invention can be achieved by adding a nickel organic compound and a zinc organic compound, in place of cobalt organic compounds. Namely, the present inventors have found that adding a nickel organic compound and a zinc organic compound in combination can produce an excellent adhesive property as compared with the case using a cobalt organic compound alone, and that an adhesion accelerator containing the above two compounds can produce an excellent adhesive property during a process of vulcanization at a high temperature and provide an excellent storing stability to the rubber kneaded therewith.

Namely, the present invention is directed to:

(1) An adhesion accelerator for improving the bonding of vulcanized rubber to metal, in which the improvement is characterized in the adhesion accelerator comprising:

at least one nickel organic compound selected from the group consisting of Ni-containing soaps having carboxylic acid moieties each having 6 to 30 carbon atoms in its main chain, or a mixture thereof, an organic boron complex containing Ni bonded to a carboxylic acid moiety having 6 to 30 carbon atoms in its main chain, and Ni-acetyl acetonate, and at least one zinc organic compound selected from the group consisting of Zn-containing soaps having carboxylic acid moieties each having 6 to 30 carbon atoms in its main chain, or a mixture thereof, an organic boron complex containing Zn bonded to a carboxylic acid moiety having 6 to 30 carbon atoms in its main chain, and Zn-acetyl acetonate, the at least one nickel organic compound and the at least one zinc organic compound being blended together to have a Ni/Zn weight ratio of from 0.01 to 20 in the adhesion accelerator.

(2) The adhesion accelerator for bonding rubber to metal as described in the above (1), in which the nickel organic compound and the zinc organic compound are metallic soaps.

(3) The adhesion accelerator for bonding rubber to metal as described in the above (1), in which the weight ratio of Ni/Zn is from 0.05 to 10.

(4) A rubber composition for forming a vulcanized rubber having an improved adhesion to metal comprising a rubber component, sulfur and the adhesion accelerator as set forth in any of the above (1) to (3), the sulfur being present in an amount of 3 to 8 parts by weight and the adhesion accelerator being present in an amount of 0.1 to 10 parts by weight with respect to 100 parts by weight of the rubber component.

(5) A method of improving the bonding of vulcanized rubber to metal, in which the improvement is characterized in the adhesion accelerator being added to a rubber component and 3 to 8 parts by weight sulfur, based on 100 parts by weight of the rubber component, prior to the vulcanization thereof.

DETAILED DESCRIPTION OF THE PREFERRED EMBODIMENTS

As set forth above, the present invention can provide synergistic improvements in the adhesive property and storage stability of a rubber composition due to the use of a combination of a nickel organic compound and a zinc organic compound.

The nickel organic compounds used in the present invention are as mentioned above and include nickel-containing compounds such as metallic soaps of a carboxylic acid. Examples of such compounds are nickel naphthenate, nickel neodecanate, nickel stearate, nickel-containing organic boron complex and nickel acetylacetonate.

The zinc organic compounds used in the present invention are as mentioned above and include zinc-containing compounds such as metallic soaps of a carboxylic acid. Examples of such compounds are zinc naphthenate, zinc neodecanate, zinc stearate, zinc-containing organic boron complex and zinc acetylacetonate.

Carboxylic acids used to form metallic soaps are natural or synthetic saturated or unsaturated carboxylic acids having 6 to 30 carbons in their main chains, or a mixture thereof. The carbon of a carboxylic group is excluded from the above-mentioned number of carbons. More specific examples are caproic acid, caprylic acid, capric acid, lauric acid, myristic acid, palmitic acid, stearic acid, iso-stearic acid, arachic acid, behenic acid, oleic acid, linoleic acid, linolenic acid, ricinoleic acid, 12-hydroxy stearic acid, dimeric acid, tall oil acid, naphthenate, neodecanoic acid, resin acid. Alternatively, there may be exemplified natural fatty acids, such as fish oil hardened fatty acid or beef tallow hardened fatty acid containing as its main component one or more of the above-listed acids. Therefore, as the metallic soaps obtained by using these carboxylic acids, nickel naphthenate and zinc neodecanate may be mentioned as preferable examples.

Further, in the present invention, metallic soaps as mentioned above may be used in the form of a mixed soap thereof and such a mixed soap may be prepared by a conventional process, such as a double decomposition process with alkali metallic soaps as intermediate products, a direct reaction process involving a direct reaction between metallic compounds and carboxylic acids, etc.

When a nickel organic compound and a zinc organic compound are to be added into a rubber material, these two compounds may be mixed in advance before being added into the rubber material, although they may be added separately to the rubber material.

Organic boron complexes containing Ni and Zn bonded to a carboxylic acid moiety having 6 to 30 carbon atoms in its main chain can be used as the nickel organic compound and the zinc organic compound, respectively. These organic boron complexes may be replaced by an organic boron complex containing both Ni and Zn. Examples of the organic boron complexes include an organic boron complex represented by the formula $B(ONiOOCR)_{3-n}(OZnOOCR)_n$, wherein R represents a hydrocarbon having 6 to 30 carbons and n is from 0 to 3. Carboxylic acids used to form the organic boron complexes may be those as mentioned above for the metallic soaps.

Further, the present invention also provides a rubber composition comprising rubber and the above-mentioned adhesion accelerator wherein the adhesion accelerator is added in an amount of 0.1–10 parts by weight with respect to 100 parts by weight of the rubber.

In the present invention, the mixing ratio of the nickel organic compound and the zinc organic compound is from 0.01 to 20, preferably from 0.05 to 10, more preferably from 0.1 to 5, in terms of the weight ratio of metal nickel to metal zinc, Ni/Zn. If the metal weight ratio of Ni/Zn is less than 0.01, any significant improvement cannot be obtained in adhesive strength as compared with a case of using a cobalt soap alone, during vulcanization at high temperature. On the other hand, if the ratio of Ni/Zn is more than 20, the adhesiveness will decrease.

In forming a rubber composition according to the present invention, as the rubber component, there can be used a natural rubber, a synthetic isoprene rubber, and some diene rubbers such as a styrene diene rubber, a polybutadiene rubber, all of which may be used as a mixture thereof. Further, the rubber component is preferred to contain a natural rubber and/or a synthetic isoprene rubber in an amount of 50 wt % or more.

Moreover, in the rubber composition of the present invention, the aforesaid adhesion accelerator is added in an amount of 0.1–10.0 parts by weight, preferably 0.2–5.0 parts by weight, with respect to 100 parts by weight of the rubber component. If the adhesion accelerator is added in an amount of less than 0.1 parts by weight, any improvement cannot be obtained in the adhesive strength after vulcanization. On the other hand, if the adhesion accelerator is added in an amount of more than 10.0 parts by weight, the adhesive strength will decrease.

Further, in the rubber composition of the present invention, a sulfur is added in an amount of 3–8 parts by weight with respect to 100 parts by weight of the rubber component.

Moreover, in the rubber composition of the present invention, a vulcanization accelerator (e.g., sulfene amide, chiazole, thiuram) may be added in an amount of 0.2–5 parts by weight with respect to 100 parts by weight of the rubber component.

In addition, compounding ingredients commonly used in a rubber manufacturing industry may be added in any appropriate amounts to the rubber composition of the present invention. Examples of such compounding ingredients include pigments such as carbon black or silica, softeners, anti-aging agents (antioxidants) such as amine/ ketone, diarylamine, etc.

Although metal to be bonded to the rubber composition of the present invention is not limited to specific kinds or shapes, steel cords are preferably used. In order to enhance the adhesion between the metal and the rubber, it is preferred to use metal plated with brass or zinc or metal plated with brass or zinc combined with nickel or cobalt. More preferably, metal to be bonded with the rubber is plated with copper. Also, there is not any limitation to the twisting structure of such metal material.

The present invention will be described in more detail below by giving some examples and comparative examples in the following.

EXAMPLE 1

A rubber composition was prepared with the composition shown in Table 1.

Here, nickel naphthenate/zinc naphthenate (Ni content: 2.0%, Zn content: 9.0%, mol ratio of Ni/Zn: ¼) obtained by double decomposition was used as a metal organic compound. Cobalt naphthenate used in a comparative example had a cobalt content of 10.1%. ACCEL DZ-G (Manufactured by Kawaguchi Chemical Industry Co., Ltd. N,N-dicyclohexyl-2-benzochiazole sulfene amide) was used as a vulcanization accelerator. Further, ANTIAGE 6C (Manufactured by Kawaguchi Chemical Industry Co., Ltd. N-1,3-dimethylbutyl-N'-phenyl-p-phenylene diamine) was used as an anti-aging agent (antioxidant).

Testing Procedures

A rubber composition formed by blending together the components in the respective proportions shown in Table 1 was kneaded in a two-roller test kneader so as to produce rubber sheets each having a thickness of 12 mm. Then, steel cords each having a size of 1×5×0.25 mm plated with brass (Cu content: 70%, Zn content: 30%) were embedded between the rubber sheets. Then, the sheets with the steel cords interposed therebetween were further subjected to vulcanization at a temperature of 145° C. for about a time period of 30 minutes, thereby obtaining samples for each rubber composition in which the steel cords were embedded.

Each of the inventive sheet samples obtained in the above process was then subjected to a pull-out test in accordance with the procedures specified in ASTM-2229, thereby measuring the adhesive strength between the rubber and the steel cords in terms of adhesion percentage of rubber to the steel cords. The test results are shown in Table 2.

As a comparative example, the same adhesion test was performed on the comparative sample in which adhesion of the rubber to the steel cords was performed using the above-mentioned conventional cobalt soap, i.e., cobalt naphthenate, as a metal organic compound.

Each of the adhesion test values shown in Table 2 is an index number calculated from the average value of 20 samples, taking the index number of the average value of the comparative example as 100. The larger the values shown in Table 2, the better the test results should be deemed as.

TABLE 1

Rubber Composition

| Composition | Added amount (parts by weight) |
| --- | --- |
| Natural rubber | 100.0 |
| Carbon black | 55.0 |
| Zinc oxide | 8.0 |
| Antioxidant | 2.0 |
| Insoluble sulfur | 5.0 |
| Vulcanization accelerator | 1.0 |
| Metal organic compound | 1.5 |

TABLE 2

Aging test on adhesive property of rubbers with addition of metal soaps in various Zn/Ni ratios

| | Un-aged | Steam aged | Moisture-heat aged | Heat aged | 20%-salt aged |
| --- | --- | --- | --- | --- | --- |
| Example 1 | 100 | 102 | 110 | 100 | 167 |
| Comparative Example | 100 | 100 | 100 | 100 | 100 |

The un-aged adhesive property was determined by measuring the adhesive property of each sample after vulcanizing the sample at a temperature of 145° C. for 25 minutes.

The steam-aging property was determined by aging the above vulcanized sample at a temperature of 121° C. for 6 hours and then measuring the adhesive property of the sample.

The moisture and heat-aging property was determined by letting the above vulcanized sample stand at a temperature of 85° C. and a humidity of 95% for 5 days and then measuring the adhesive property of the sample.

The heat-aging property was determined by letting the above vulcanized sample stand at a temperature of 85° C. for 10 days and then measuring the adhesive property of the sample.

The aging property in a 20% salt solution was determined by immersing the above vulcanized sample in a 20% salt solution at a temperature of 25° C. for 15 days, then measuring the adhesive property of the sample after drying.

It is understood from Table 2 that even in the above tests for measuring the moisture and heat-aging property and the aging property in the 20% salt solution, which tests were both conducted on the assumption of a severe corrosive environment, the rubber composition of the present invention was greatly improved in various properties as compared with a conventional rubber composition using the conventional cobalt naphthenate.

EXAMPLE 2

Nickel naphthenate, nickel naphthenate/zinc naphthenate and zinc naphthenate were produced by double decomposition. Using each of these compounds, a rubber composition was kneaded in the same way as described in Example 1 and was tested for adhesive property. The test results are shown in Table 3.

TABLE 3

Comparison of Adhesion Test Results for Nickel Naphthenate/Zinc Naphthenate, Nickel Naphthenate and Zinc Naphthenate

| Zn content (%)[1] | Ni content (%)[2] | Added amount (phr)[3] | Un-aged | Steam aged | Moisture-heat aged | Heat aged | 20%-salt aged |
| --- | --- | --- | --- | --- | --- | --- | --- |
| — | 12.1 | 1.30 | 99 | 107 | 87 | 105 | 145 |
| 5.3 | 5.8 | 1.42 | 100 | 112 | 110 | 105 | 150 |
| 11.4 | — | 1.38 | 96 | 92 | 64 | 97 | 140 |

[1] and [2]: Zn content and Ni content are contents of the respective metals in the respective metallic soaps.
[3]: Added amount of each metallic soap added during rubber kneading As is understood from Table 3, the rubber composition containing the nickel naphthenate/zinc naphthenate showed a better adhesive property than the other rubber compositions containing either the nickel naphthenate or the zinc naphthenate, both in the aging test in 20% salt solution and the moisture and heat-aging test. These test results show that the rubber composition containing the nickel naphthenate/zinc naphthenate had a well-balanced adhesive property as compared with the rubber compositions containing either the nickel naphthenate or the zinc naphthenate.

EXAMPLE 3

A nickel naphthenate/zinc neodecanate having the following metal contents was produced by double decomposition and kneaded with other components in the same compounding proportions as described in Example 1. The resultant rubber composition was tested for adhesive property. The test results are shown in Table 4.

TABLE 4

Adhesion Test Results for Nickel Naphthenate/Zinc Neodecanate

| Zn content (%) | Ni content (%) | Added amount (phr)* | Un-aged | Steam aged | Moisture-heat aged | Heat aged | 20%-salt aged |
| --- | --- | --- | --- | --- | --- | --- | --- |
| 6.9 | 6.7 | 1.23 | 106 | 110 | 115 | 105 | 155 |

*Added amount of each metallic soap added during rubber kneading

As is understood from Table 4, the rubber composition containing the nickel naphthenate/zinc neodecanate exhibited an excellent adhesive property like the rubber composition containing nickel naphthenate/zinc naphthenate.

As can be understood from the above description, since the adhesion accelerator of the present invention for bonding rubber to steel cords is prepared by adding a metal organic compound containing nickel and another metal organic compound containing zinc, it is sure to more effectively inhibit a deterioration of the adhesive strength, which is considered to be caused especially due to corrosion, as compared with a conventional adhesion accelerator containing a conventional cobalt organic compound alone.

Therefore, the present invention can suitably be applied to the manufacture of a rubber product such as a tire and a belt conveyer in which steel cords are used as a reinforcement.

What is claims is:

1. An adhesion accelerator for improving the bonding of vulcanized rubber to metal, in which the improvement is characterized in said adhesion accelerator comprising:

at least one nickel organic compound selected from the group consisting of Ni-containing soaps having carboxylic acid moieties each having 6 to 30 carbon atoms in its main chain, or a mixture thereof, an organic boron complex containing Ni bonded to a carboxylic acid moiety having 6 to 30 carbon atoms in its main chain, and Ni-acetyl acetonate, and at least one zinc organic compound selected from the group consisting of Zn-containing soaps having carboxylic acid moieties each having 6 to 30 carbon atoms in its main chain, or a mixture thereof, an organic boron complex containing Zn bonded to a carboxylic acid moiety having 6 to 30 carbon atoms in its main chain, and Zn-acetyl acetonate, the at least one nickel organic compound and the at least one zinc organic compound being blended together to have a Ni/Zn weight ratio of from 0.01 to 20 in said adhesion accelerator.

2. The adhesion accelerator of claim 1, wherein said nickel organic compound and said zinc organic compound are metallic soaps.

3. The adhesion accelerator of claim 1, wherein said nickel and zinc compounds are naphthenates.

4. The adhesion accelerator of claim 1, wherein said nickel organic compound is nickel naphthenate and said zinc organic compound is zinc neodecanate.

5. The adhesion accelerator of claim 1, wherein said weight ratio of Ni/Zn is 0.05 to 10.

6. The adhesion accelerator of claim 1, wherein the adhesion accelerator consists essentially of the at least one nickel organic compound and the at least one zinc organic compound.

7. A rubber composition for forming a vulcanized rubber having an improved adhesion to metal comprising a rubber component, sulfur and an adhesion accelerator comprising at least one nickel organic compound selected from the group consisting of Ni-containing soaps having carboxylic acid moieties each having 6 to 30 carbon atoms in its main chain, or a mixture thereof, an organic boron complex containing Ni bonded to a carboxylic acid moiety having 6 to 30 carbon atoms in its main chain, and Ni-acetyl acetonate, and at least one zinc organic compound selected from the group consisting of Zn-containing soaps having carboxylic acid moieties each having 6 to 30 carbon atoms in its main chain, or a mixture thereof, an organic boron complex containing Zn bonded to a carboxylic acid moiety having 6 to 30 carbon atoms in its main chain, and Zn-acetyl acetonate, the at least one nickel organic compound and the at least one zinc organic compound being blended together to have a Ni/Zn weight ratio of from 0.01 to 20 and the sulfur being present in an amount of 3 to 8 parts by weight and the adhesion accelerator being present in an amount of 0.1 to 10 parts by weight with respect to 100 parts by weight of the rubber component.

8. The rubber composition of claim 7, in which said nickel organic compound and said zinc organic compound are metallic soaps.

9. The rubber composition of claim 7, wherein said nickel and zinc compounds are naphthenates.

10. The rubber composition of claim 7, wherein said nickel organic compound is nickel naphthenate and said zinc organic compound is zinc neodecanate.

11. The rubber composition of claim 7, wherein said weight ratio of Ni/Zn is 0.05 to 10.

12. The rubber composition of claim 7, wherein said adhesion accelerator is added in an amount of 0.2 to 5.0 parts by weight with respect to 100 parts by weight of the rubber component.

13. The rubber composition of claim 7, wherein the adhesion accelerator consists essentially of the at least one nickel organic compound and the at least one zinc organic compound.

14. A method of improving the bonding of vulcanized rubber to metal, in which the improvement is characterized in an adhesion accelerator comprising at least one nickel organic compound selected from the group consisting of Ni-containing soaps having carboxylic acid moieties each having 6 to 30 carbon atoms in its main chain, or a mixture thereof, an organic boron complex containing Ni bonded to a carboxylic acid moiety having 6 to 30 carbon atoms in its main chain, and Ni-acetyl acetonate, and at least one zinc organic compound selected from the group consisting of Zn-containing soaps having carboxylic acid moieties each having 6 to 30 carbon atoms in its main chain, or a mixture thereof, an organic boron complex containing Zn bonded to a carboxylic acid moiety having 6 to 30 carbon atoms in its main chain, and Zn-acetyl acetonate, blended together to have a Ni/Zn weight ratio of from 0.01 to 20, being added in an amount of 0.1 to 10 parts by weight, based on 100 parts by weight of the rubber component, to a rubber component and 3 to 8 parts by weight of sulfur, based on 100 parts by weight of the rubber component, prior to the vulcanization thereof.

15. The method of claim 14, wherein said nickel and zinc compounds are soaps.

16. The method of claim 14, wherein said nickel and zinc compounds are naphthenate.

17. The method of claim 14, wherein said nickel organic compound is nickel naphthenate and said zinc organic compound is zinc neodecanate.

18. The method of claim 14, wherein the Ni/Zn weight ratio is from 0.05 to 10.

19. The method of claim 14, wherein said adhesion accelerator is added in an amount of 0.2 to 5.0 parts by weight with respect to 100 parts by weight of the rubber component.

20. The method of claim 14, wherein said metal is steel.

21. The method of claim 14, wherein the adhesion accelerator consists essentially of the at least one nickel organic compound and the at least one zinc organic compound.

* * * * *